United States Patent
Bennett

(10) Patent No.: US 9,304,714 B2
(45) Date of Patent: Apr. 5, 2016

(54) LUN MANAGEMENT WITH DISTRIBUTED RAID CONTROLLERS

(71) Applicant: VIOLIN MEMORY INC., Mountain View, CA (US)

(72) Inventor: Jon C. R. Bennett, Sudbury, MA (US)

(73) Assignee: VIOLIN MEMORY INC, Santa Clara, CA (US)

( * ) Notice: Subject to any disclaimer, the term of this patent is extended or adjusted under 35 U.S.C. 154(b) by 213 days.

(21) Appl. No.: 13/865,702

(22) Filed: Apr. 18, 2013

(65) Prior Publication Data

US 2013/0282980 A1     Oct. 24, 2013

Related U.S. Application Data

(60) Provisional application No. 61/636,086, filed on Apr. 20, 2012.

(51) Int. Cl.
*G06F 12/10* (2006.01)
*G06F 3/06* (2006.01)

(52) U.S. Cl.
CPC ............ *G06F 3/0689* (2013.01); *G06F 3/0611* (2013.01); *G06F 3/0614* (2013.01); *G06F 3/0644* (2013.01); *G06F 3/0688* (2013.01)

(58) Field of Classification Search
CPC .... G06F 3/0689; G06F 3/0614; G06F 3/0644
USPC ......................................................... 711/114
See application file for complete search history.

(56) References Cited

U.S. PATENT DOCUMENTS

| | | | |
|---|---|---|---|
| 5,133,059 A * | 7/1992 | Ziegler et al. ................. | 711/140 |
| 6,073,218 A | 6/2000 | DeKoning et al. | |
| 8,200,887 B2 | 6/2012 | Bennett | |
| 2007/0124532 A1 | 5/2007 | Bennett | |
| 2010/0161908 A1* | 6/2010 | Nation et al. ................. | 711/147 |
| 2010/0306488 A1 | 12/2010 | Stroberger | |
| 2011/0041005 A1 | 2/2011 | Selinger | |
| 2011/0072228 A1 | 3/2011 | Nagata et al. | |
| 2011/0126045 A1 | 5/2011 | Bennett | |
| 2011/0197023 A1 | 8/2011 | Iwamitsu et al. | |
| 2011/0231605 A1 | 9/2011 | Ogawa et al. | |
| 2013/0019062 A1 | 1/2013 | Bennett et al. | |

OTHER PUBLICATIONS

International Search Report and Written Opinion of the International Searching Authority for International Application No. PCT/US2013/037062, dated Jul. 26, 2013, 7 pages.

* cited by examiner

*Primary Examiner* — Jae Yu
(74) *Attorney, Agent, or Firm* — Brinks Gilson & Lione

(57) ABSTRACT

A system and method is described for operating a computer memory system having a plurality of controllers capable of accessing a common set of memory modules. Access to the physical storage of the memory modules may be managed by configuration logical units (LUNs) addressable by the users. The amount of memory associated with each LUN may be managed in units of memory (LMA) from a same free LMA table maintained in each controller of the plurality of controllers. A request for maintenance of a LUN may be received from any user through any controller and results in the association of a free memory area with the LUN, and the remaining controllers perform the same operation. A test for misallocation of a free memory area is performed and when such misallocation occurs, the situation is corrected in accordance with a policy.

14 Claims, 10 Drawing Sheets

LUN MANAGEMENT WITH DISTRIBUTED RAID CONTROLLERS

This application claims the benefit of U.S. Provisional Application Ser. No. 61/636,086, filed on Apr. 20, 2012, which is incorporated herein by reference.

BACKGROUND

Large memory systems may service a plurality of individual using applications or clients, and such applications or clients may operate independently of each other as in, for example, virtualized systems. Alternatively, a plurality of applications may access and operate on a common memory area, such as where data has been de-duplicated, and is accessed by a plurality of users or were read-only access is provided to a plurality of users. The memory system may thus be partitioned, for example, into private (exclusive) memory areas or into shared memory areas, or any combination or variation thereof, a memory location, or range thereof, being subject to configurable access criteria. Depending on the specific needs of an application, the memory areas may be configured so as to have different reliability, access time, bandwidth and other characteristics. These characteristics may be expressed, for example, as a selection of the RAID type to be employed, the striping of the data (wide or narrow, for example), or other selectable system attributes, such as the bandwidth of the port through which a server accesses the memory system, the memory extent allocated, data backup provisions and access permissions. These attributes may be embodied in hardware, or configurable by an algorithm, data table, or the like.

A memory area may be allocated to a particular application or client may be described as a Logical Unit, and each Logical Unit may be designated, for example by a number N: hence, LUN.

As the address space size of a memory system grows, the number or bandwidth of the access points thereto may need to increase, and consideration take account of the impact of read and write loading on the access time (latency), on load balancing between the various entities (e.g., servers), and on coordinating the access to a memory location that is shared by a plurality of users. Further, in any large electronic system, hardware failures occur, and an attribute of such systems may be to isolate a failure so as to affect the smallest number of users, or to permit the repair of the failure, including recovery of the associated data, while maintaining operation of the memory system, or a portion thereof.

SUMMARY

A method and a computer program product for managing a memory system is described. The system may comprise a plurality of memory controllers in communication with a plurality of users; and, a plurality of memory modules in communication with the plurality of memory controllers.

The method of managing the memory system may include maintaining, at a group of controllers of the plurality of controllers, a same pool of free memory areas of the plurality of memory modules and logical units are formed from free memory areas selected from the same pool. When a request for maintenance of a logical unit is received at a controller of the plurality of controllers, selecting a free memory area from the same pool of free memory areas and associating the free memory area with a logical unit; and the pool of free memory areas at the controller. In an aspect, the associated free memory area may be deleted from the pool of free memory areas.

In an aspect, the controller is operable to request each of the other controllers of the group of controllers to assign the same free memory area from the pool of free memory areas to the logical unit being maintained, and to receive a status or a success message from the other controllers.

Each of the other controllers of the group of controllers determines whether the requested same free memory area is in the pool of free memory areas of the controller; and, if the same free memory area is available in the pool of free memory areas of the controller, the free memory area may be associated with the logical unit deleted the free memory area from the pool of free memory areas of the controller. A success message would be returned to the returning a success message to the requesting controller. However, if the same free memory area is not available in the pool of free memory areas of the controller, the LUN with which the free memory area has been associated with, and the write operation status of the free memory area is determined and a status message may be returned to the requesting controller.

When a misallocation of free memory area occurs, the situation is resolve in accordance with a policy such that the free memory table is a same free memory table at each of the controllers. The recovery procedure is performed in accordance with a policy.

DESCRIPTION

Figure 1:
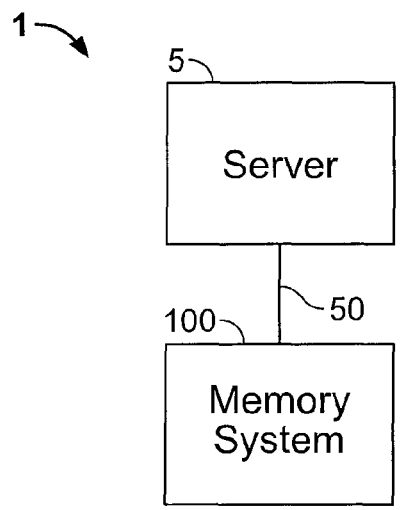
FIG. 1 is a simplified block diagram of a memory system in communication with a server.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g., software, or in hardware, or in a combination of both. The machine-executable instructions can be used to cause a general-purpose computer, a special-purpose processor, such as a DSP or array processor, or the like, that acts on the instructions to perform functions described herein. Alternatively, the operations might be performed by specific hardware components that may have hardwired logic or firmware instructions for performing the operations described, or by any combination of programmed computer components and custom hardware components, which may include analog circuits. Such components may include an Application Specific Integrated Circuit (ASIC), Field Programmable Gate Array (FPGA), or the like.

The methods may be provided, at least in part, as a computer program product that may include a non-volatile machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions or data for execution by a computing machine or special-purpose hardware and that may cause the machine or special purpose hardware to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

An example computing system 1, shown in FIG. 1, may comprise a server 5, or other source of client (e.g., user application) requests, to perform operations on a memory system 100. The most common operations to be performed are reading of data from an address in the memory system 100 for return to the server 5, or writing data provided by the server 5 to an address in the memory system 100. The data to be read or written may comprise, for example, a single address or a range of addresses, and may be described, for example, by a logical block address (LBA) of a page and a range of addresses. Herein, we use the term "page" as the minimum amount of data that may be written to the memory system, and associate a "page" with a LBA. This is intended to be a simplification of the description, rather than a limitation. A system may write data in various "page" sizes, or accumulate logical pages so as to match a manufacturer specified or recommended size for writing to the memory.

When describing data being stored to one or more pages, or portions thereof, the term "block" (of data) may be used. A person of skill in the art would appreciate that when used in this manner, the data values being stored are being described in some grouping, such as a page size, and that this would be a different use of the word then when "block" was used to describe the minimum size (number of contiguous physical pages) of the physical memory in a FLASH memory that may be erased in a single erase operation. A person of skill in the art will also recognize that other approaches to describing blocks of data may be used, including grouping pages together into "super" pages, partial LUNs, or the like, without departing from the teachings herein. These abstractions are convenient for describing the organization and operation of a memory system at a relatively high level of abstraction and are not meant to be limiting on the data structures or the hardware configuration.

In describing the operation of the system, only occasionally are error conditions and corner cases described herein. This is done to simplify the discussion so as not to obscure the overall concept of the system and method described herein. During the course of the system design and development of the computer program product that causes the system to perform the functions described herein, a person of skill in the art would expect to identify such potential abnormal states of operation, and would devise algorithms to detect, to report and to mitigate the effects of the abnormalities. Such abnormalities may arise from hardware faults, program bugs, the loss of power, improper maintenance, or the like.

The interface between the server 5, representing the global environment external to the memory system 100, and the memory system 100 may be any bus, communications media or connection type known in the art or to be developed and having an equivalent purpose, or as may be developed to perform similar functions. Interfaces such as Fiber Channel or Infiniband are currently popular in data centers. The interface 50 between a server 5 and the memory system 100 may be, for example, a PCIe bus having one or more bidirectional channels.

The logical address of the data may be specified in a variety of ways, depending on the architecture of the memory system 100 and the characteristics of the operating system of the server 5. The logical memory address space may be, for example, a flat memory space having a maximum value equal to the maximum number of memory locations that are being made available to the server 5 or other using device of the memory system 100. Additional memory locations may be reserved for internal use by the memory system 100.

Alternative addressing schemas may be used which may include the assignment of logical unit numbers (LUN) and an LBA address within the LUN. Such LUN addressing schemes are eventually resolvable into a specific logical address LBA within the overall memory system 100 address space. The address resolution may be performed within the memory system 100, in the server 5, or elsewhere. For simplicity, the descriptions herein generally presume that a LUN and address therein has been resolved into a logical address within a flat memory space of the memory system 100. The association between the logical address space and the actual physical location of the storage of data may be managed by a service program of the memory system 100.

A computing system may use, for example, a 64-bit binary address word resulting in a theoretical byte-addressable memory space of 16 exabytes ($16 \times 2^{60}$ bytes). Legacy computing systems may employ a 32-bit binary address space and are still in use. A 64-bit address space is considered to be adequate for current needs, but should be considered to be for purposes of illustration rather than a limitation, as both smaller and larger size address words may be used. In some cases, the size of an address word may be varied for convenience at some level of a system where either a portion of the address word may be inferred, or additional attributes expressed.

The logical address value LBA may be represented in decimal, binary, octal, hexadecimal, or other notation. A choice of representation made herein is not intended to be limiting in any way, and is not intended to prescribe the internal representation of the address for purposes of processing, storage, or the like.

Commands and data may be received, or requested by the memory system 100 (FIG. 2) from the server 5 over the interface 50 based on the number of requests that may be accommodated in, for example, a RAID controller 10 (RC) of the memory system 100. The RC may have an input buffer 11 that may queue a plurality of commands (operations requests) and data that are to be executed by the memory system 100. The commands and data may be retained in the buffer 11, which may be volatile or non-volatile memory, until at least the time that the results of the operations being performed are reliably committed the non-volatile memory of the storage memory 200. The RAID engine 12 may de-queue commands (e.g., READ, WRITE) and any associated data from the input buffer 11 and the logical block address LBA of the location where the data is to be stored, or is stored from the input buffer 11. The RC 12 may decompose the logical block address and the block of data into a plurality of logical addresses, where the logical address of each portion of the original block of data is associated with a different storage module so that the storage locations for each of the plurality of sub-blocks thus created distributes the data over the physical storage memory 200 so that a failure of a hardware element may not result in the loss of more of the sub-blocks of data that can be corrected by the RAID approach being used. Of course, a system without RAID could also be designed to perform LUN management for multiple controllers using the concepts disclosed herein, depending on the reliability and other practical considerations.

In simple example, using an array of RAIDed disks would mean that each of the sub-block data blocks (sometimes called "strips") and the parity data strip would reside on a different disk, so as to provide redundancy in the storage of the data. The RC engine 12 may compute a parity or other redundant data over the entire block of data, and store the computed sub-block on storage modules selected such that a failure of that storage module, or a failure of a module storing a sub-block of any data type does not compromise the data of the data block being stored. In this manner, for example, the parity or other redundancy data may be used to reconstruct the data of a failed disk or memory module. That is, for example, the remaining valid sub-blocks (strips) and the parity data strip may be used to recover the data of a lost sub-block. Alternatively, if the disk on which the parity data fails, all of the sub-blocks of the block of data remain available to reconstruct the parity sub-block; the data may be recovered in this instance without use of the parity data, but the parity data may be recomputed and stored in an operating module so as to continue to provide the RAID protection. Sub-blocks of a block of data, or the parity data sub-block, may also be called "chunks" or "strips." A disk has been used in this example as a memory module; however, a person of skill in the art would recognize that this applies to a variety of types of memory technologies and hardware configurations.

Figure 2:
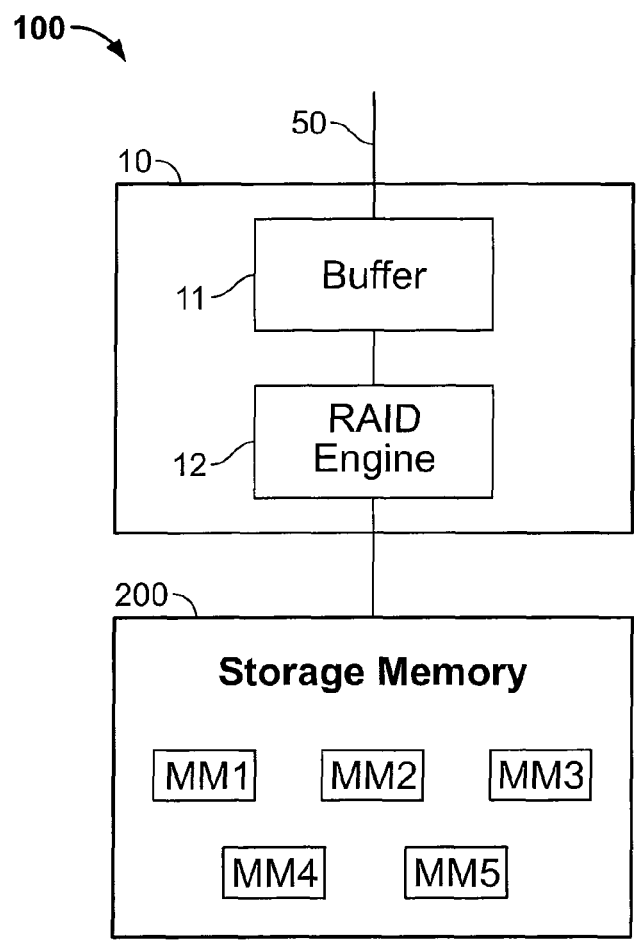
FIG. 2 is a simplified block diagram of the memory system having a controller in communication with the storage memory.

There may be, for example, 5 memory modules, as shown in FIG. 2, of which four modules may be allocated to store sub-blocks of the data block having a block address LBA and a size B. In this example, four of the memory modules MM each store B/4 of the data words of the data block of the LBA, and the fifth module stores the parity data (equal to B/4 parity data words for each block of data). A group of memory modules that are used to store the data, which may include parity data of the group or of another group, may be termed a RAID group or stripe. The number of sub-blocks, and the number of memory modules (MM) in the RAID group may be variable and a variety of RAID groups and types may be configured from a physical storage memory system, and a plurality such other configurations may exist contemporaneously. The particular example here is used for convenience and clarity of explanation.

The RAID group may be broadly striped across a large memory array, for example as described in U.S. patent application Ser. No. 12/901,224, "Memory System with Multiple Striping", which is commonly assigned and is incorporated herein by reference. Different RAID striping modalities may be interleaved in the memory address space.

The RAID controller may use the logical block address LBA (or LUN) of the user request, or some other variable to assign the command (READ, WRITE) to a particular RAID group (e.g., RG1) comprising a group of memory modules that are configured to be a RAID group. Particular organizations of RAID groups may be used to optimize performance aspects of the memory system for a particular user.

In an example, the logical block address may be aligned on integral 4K byte boundaries, the increment of block address may 4K and the data may be stored in a RAID group. Let us consider an example where there are up to 16 RAID groups (0-Fh), and the mapping of the logical block address to a RAID group is achieved by a simple algorithm. A logical block address may be: 0x0000000000013000. The fourth least significant nibble (3) of the hexadecimal address may be used to identify the RAID group (from the range 0-F, equivalent to RAID groups 1-16). The most significant digits of the address word (in this case 0x000000000001) may be interpreted as a part of the logical address of the data in a RAID group (the upper most significant values of the logical address of the data on a module in a RAID group); and the last three nibbles (in this case 0x000) would be the least significant values of the logical address of the data stored in RAID group 3 (RG3). The complete logical address block address for the data in RG3 would be 0x000000000001000 (in a situation where the digit representing the RAID group is excised from the address word) for all of the MM in the RAID group to which the data (and parity data) is stored.

Figure 3:
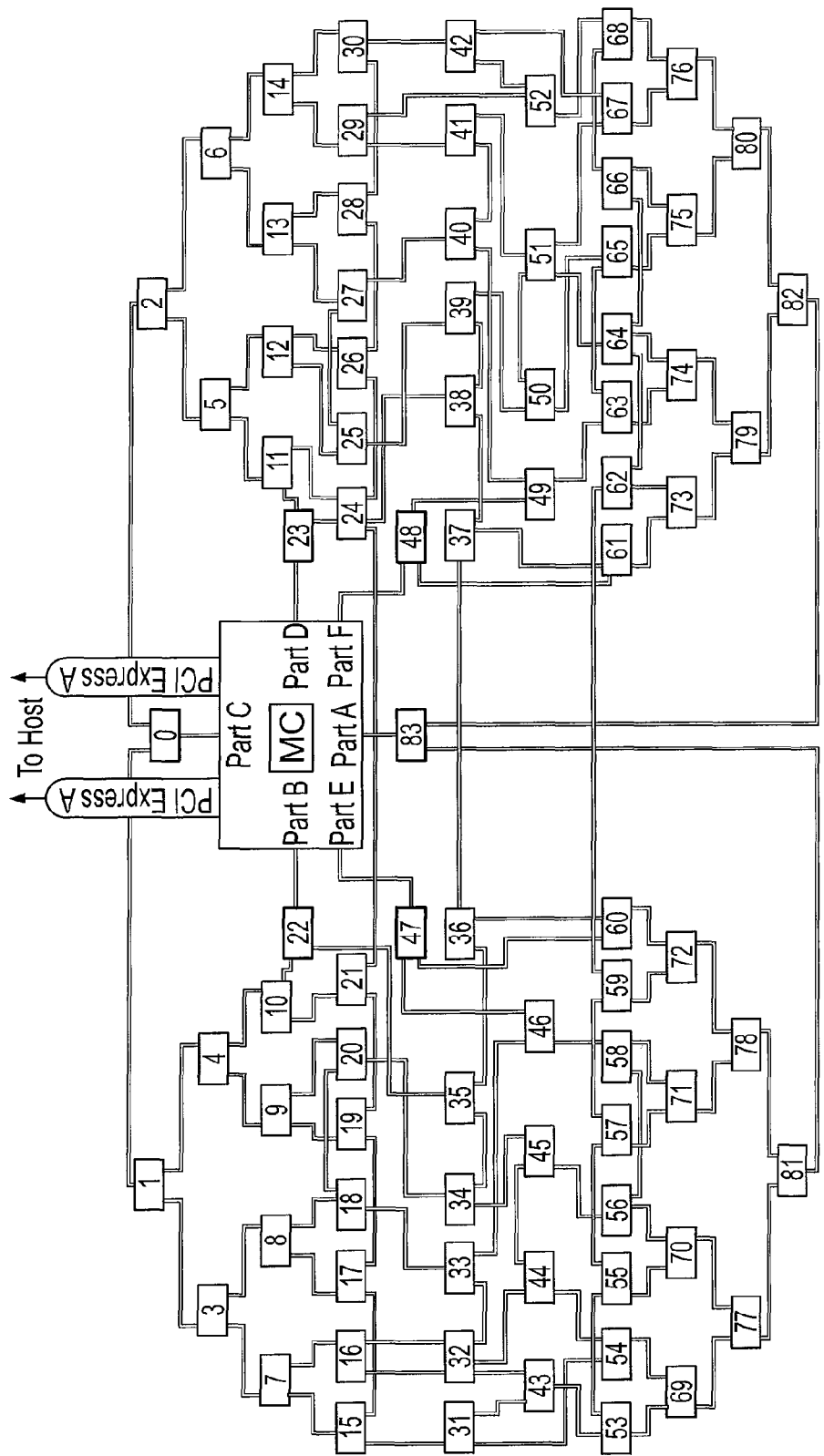
FIG. 3 is an example of a memory system having a plurality of memory modules arranged in a tree in communication with one or more servers.
Figure 4:
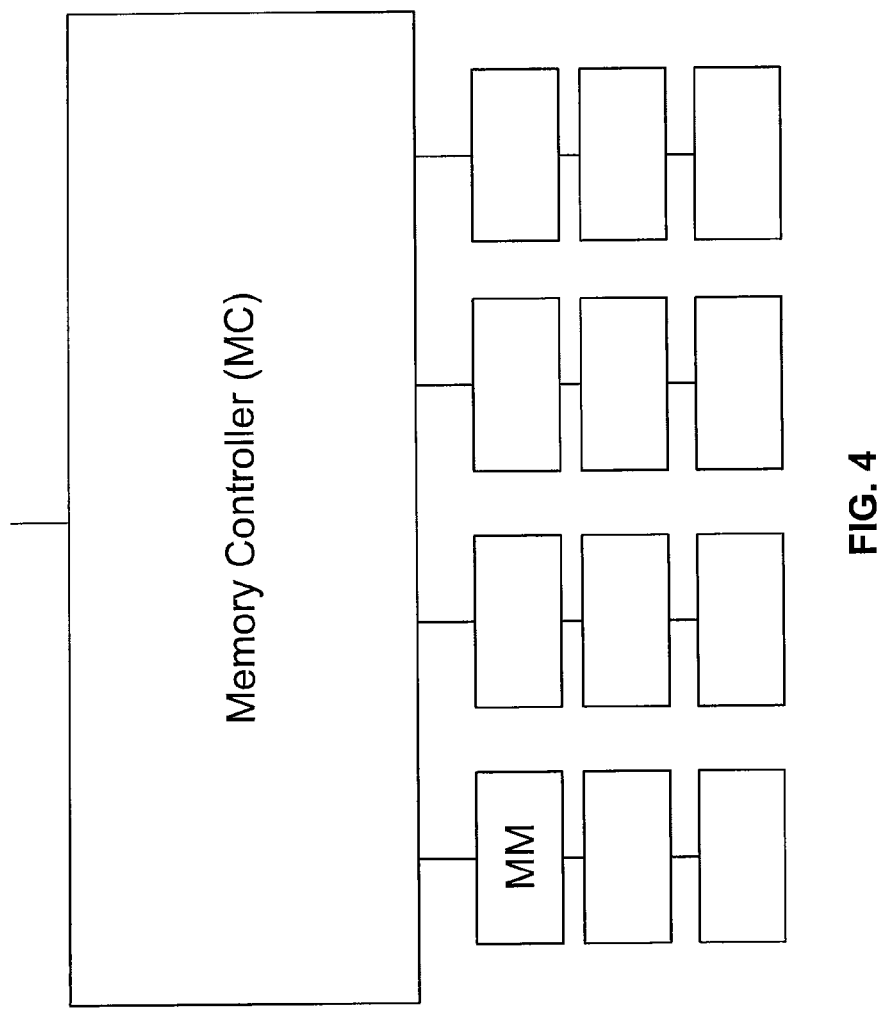
FIG. 4 is an example of a memory system having a plurality of memory modules arranged in a plurality of linear busses.

The routing of the commands and data (including the parity data) to the memory modules MM of the memory system 100 depends on the architecture of the memory system. Two example architectures are illustrated. FIG. 3 illustrates a tree-type architecture and FIG. 4 illustrates a plurality of linear busses.

The memory system shown in FIG. 3 comprises 84 individual memory modules connected in double-ended trees and ancillary roots that are serviced by memory controllers to form a "forest". Memory modules MM0 and MM83 may be considered as root modules for a pair of double-ended binary trees. Memory modules MM1, MM2, MM81 and MM82 may be considered to be root memory modules of individual trees in the memory. Memory modules MM22, MM23, MM47 and MM48 may act as root modules for portions of the memory system tree so as to provide further connectivity in the event of a memory module failure, or for load balancing.

The memory controller MC may connect to the remainder of the memory system 100 by one or more PCIe channels. Moreover, the memory controller itself may be comprised of a plurality of memory controllers for redundancy purposes.

The individual memory modules MM, or portions thereof, may be assigned to different RAID groups (RG).

TABLE 1

| RAID Group | C0 | C1 | C2 | C3 | P |
|---|---|---|---|---|---|
| 0 | | | | | |
| 1 | | | | | |
| 2 | | | | | |
| 3 | MM23 | MM1 | MM16 | MM17 | MM20 |
| 4 | | | | | |
| . | | | | | |
| . | | | | | |
| . | | | | | |
| 15 | | | | | |

For clarity, only the memory modules currently assigned to one RAID group (RG3) are shown in Table 1. As there are 16 RAID groups in this example, each associated with 5 MMs, a total of 80 MMs would be associated with the currently configured RAID groups. Since the tree of FIG. 3 may accommodate 84 MM, this can permit up to 4 MM to be allocated as spare modules, immediately available should a MM fail.

Table 1 provides the basis for the configuration of a routing table so that a routing indicator can be established between any particular port (labeled A-F in FIG. 3) of the memory controller MC and the destination module MM for a sub-block of block of data, or the parity thereof, to be stored at an address in the selected RG.

The routing indicator may be used to determine the path from the MC to the individual MM. The routing may be determined, for example, at the memory controller MC and the routing executed by switches in the MMs along the path as described in Ser. No. 11/405,083, "Interconnection System", which is commonly assigned and is incorporated herein by reference. Other approaches can also be used to cause the commands and data to be forwarded form the MC to the appropriate MMs.

Each memory module MM may store the data in a physical address related to the logical block address. The relationship between the logical block address (LBA) and the physical address depends, for example, on the type of physical memory used and the architecture of memory system and subsystems, such as the memory modules. The relationship may be expressed as an algorithm or by metadata. Where the memory type is NAND FLASH, for example, the relationship between the logical address and the physical address may be mediated by a flash translation layer (FTL). The FTL provides a correspondence between the data logical block address LBA and the actual physical address PA within the FLASH chip where the data is stored. The FTL may account, for example, for such artifacts in FLASH memory as bad blocks, and for the physical address changes of stored data associated with garbage collection and wear leveling, which are desired to be accommodated while the memory system is operating.

In the present example of operation, a 4K byte data block is separated into 4 1K chunks (sub-blocks), and a 1 K byte parity chunk P computed over the 4 data chunks. The parity P may be used for RAID reconstruction or may also be used for implementing "erase hiding" in a FLASH memory system, as described in a U.S. patent application Ser. No. 12/079,364, "Memory Management System and Method", which is commonly assigned and is incorporated herein by reference. When the data is received at the destination MM, the logical block address LBA is interpreted so as to store or retrieve the data from the physical memory. Since the chunks stored in the MM of a RG have an ordered address relationship to the data block of which they are a constituent, the storage of the chunk on a MM may be adequately described by the logical block address of the data block.

Returning to FIGS. 1 and 2, consider a path for a data write or read command that is received over the interface 50 from the server 5. The RAID controller RC 10 determines the appropriate RG of the memory 200 that will be accessed, and routes the command (and any associated data payload) to the memory 200. The routing may be through a switch fabric in a networked storage environment, or directly to the memory 200. If the command is consistently routed from the server 5 to the memory, the commands would be received in order by the memory 200. Similarly, if the commands were consistently routed to the various storage locations in the memory 200, such as by the routing table (Table 1) used in the memory of FIG. 3, the commands would be received in order at each MM. At each memory module, the commands may be put in a queue and executed in order. In such an instance, an earlier pending write command to a particular write address would be executed prior to a later read command for the same address, and the data that would be read by the read command represents the most current data at that memory location.

Management of the reading and writing to the MMs in a system having multiple RAID controllers is described U.S. Ser. No. 13/546,346, filed on Jul. 7, 2012, entitled "RAIDed Memory System", which is incorporated herein by reference.

The memory system 1 may interface with servers, with another network, or with a combination of such sources and destinations of data using switches, bridges or other equipment and techniques so as to respond to read requests or write requests, or other functional commands, or where the write requests may include a payload of data to be stored.

Figure 5:
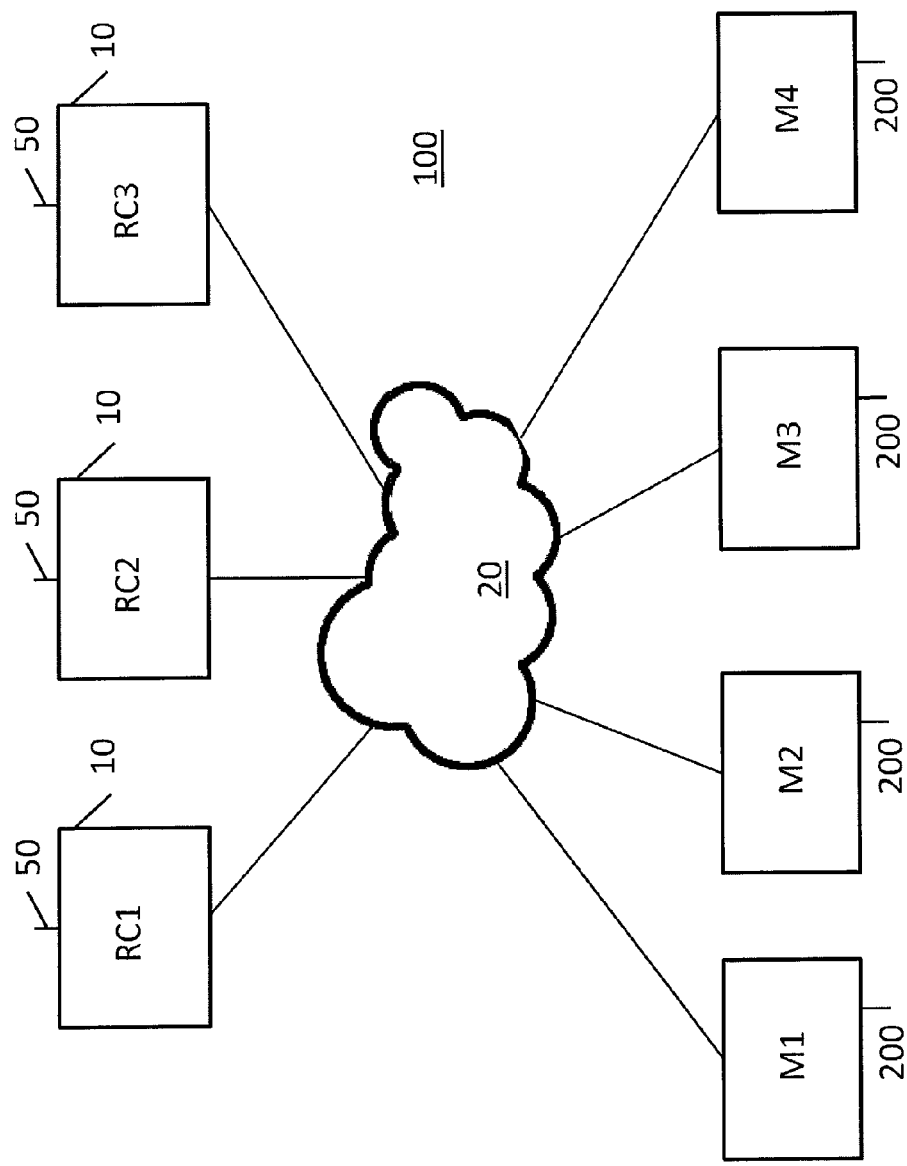
FIG. 5 is an example of a memory system having a plurality of RAID controllers in communication with a plurality of memory modules, where each RAID controller may have an interface to a server.

As shown in FIG. 5, a RAID controller, such as RC1, receiving commands through external interface 50, may operate on the logical block address (LBA) of the request so as to convert the address into an association of chunks of data of the data block request with destinations in the memory system. Taking an example where the block is divided into 4 equal sized chunks and a parity computed over the block to provide the fifth chunk, the individual chunks may be assigned to memory modules in any of the memory arrays 200 in accordance with a policy. Where the data is RAIDed data, the policy may include not storing any two chunks of the data block or parity data in a same module of a memory, or in a same equipment enclosure, or in a same equipment rack, as examples. The extent of the physical memory data area that is considered to be a module of the memory may depend on the organization of the memory, the failure modalities expected, the level of data reliability needed for a particular user, or other performance attributes. In a large memory system, servicing a plurality of user tasks, the criteria may differ for each of the user tasks. Consequently the definition of a module may range from a die, to a package, to a field replaceable device, to a memory array, to a group of memory arrays, or the like.

Use of the term "module" therefore has a meaning that is context dependent. Here a meaning may be that the level of partitioning the system is governed by the desire to only store as many of the sub-blocks (chunks) of data of a data block on a particular hardware element as can be corrected by the RAID approach chosen, in the case where the "module" has failed. In other contexts, which may be within the same memory system, a module may have a different meaning. For example, when the concept of "erase hiding" is being used, the module may represent that portion of memory that is scheduled, configured, or controlled for a particular write or erase period of operation. There may be more than one "erase hiding" scheme in a module defined for RAID.

The system and method described herein may be controlled and operated by a software program product, the product being stored on a non-volatile machine-readable medium. The software product may be partitioned so as to be resident in the RC, MC, MM and elsewhere so as to cooperatively implement all or part of the functionality described. The computing devices may be a combination of diverse processing devices with internal or external memory for program and data storage, and may include, for example, ASICs (application specific integrated circuits), FPGAs (field programmable gate arrays), microcontrollers, microprocessors, CPUs (central processing units) or the like, as are known or may be developed. Such computing elements may be configured as parallel processors, hardware-based encoders, protocol converters and other functional elements of the system.

The preceding description used a data block of 4 KB for illustrative purposes. While it appears that many new designs of data processing systems are using this block size, both larger and smaller block sizes may be used. A system optimized for 4 KB data blocks may be configured to that operate with legacy systems using block sizes of, for example, 128 bytes, which may be of the size order of a cache line. Page sizes of 256, 512, 1024 and 2048 bytes may also be used, and will be recognized as previously used in disk systems, for example. The smallest writable page size of currently available mass market FLASH is 512 bytes, and writes of less than 512 bytes may either be padded with a constant value, or shared with other small data blocks. When the data block is read, even if a larger data block is read from the FLASH, the desired data may be extracted from the output buffer of the device. When servicing the sub-optimum block sizes, the number of read and write operations may be increased relative to the example described above.

The level of the system and sequence of performing the various methods described herein may be altered depending on the performance requirements of a specific design and is not intended to be limited by the description of specific illustrative examples.

Figure 6:
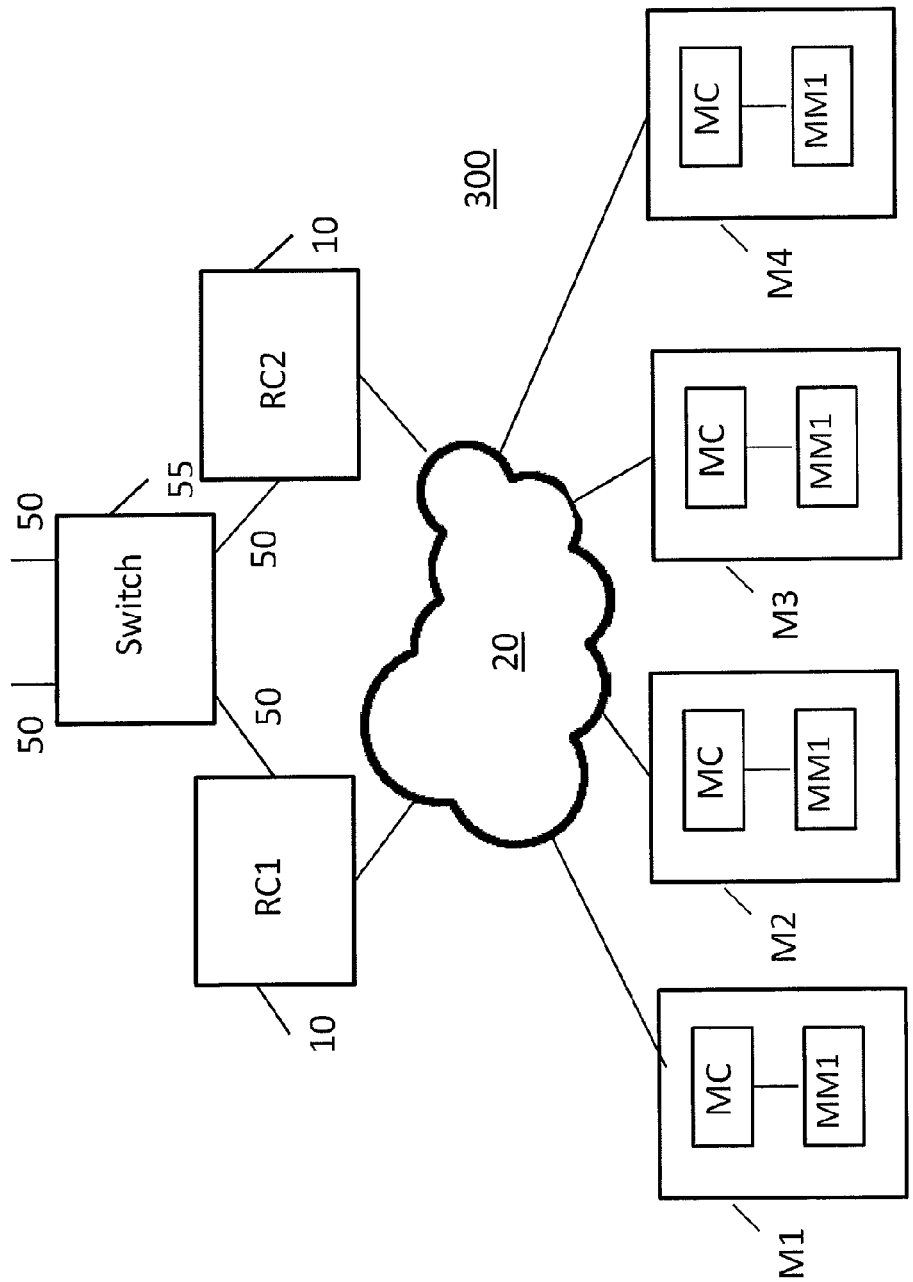
FIG. 6 is another example of a memory system having a plurality of RAID controllers, where the interface to a server may be routed to either of the RAID controllers, and the RAID controllers are in communication with shared memory modules which may have memory controllers and a plurality of memory circuits.

FIG. 6 is a simplified block diagram of a redundant RAID system that may be helpful in understanding the processes associated with RAID reconstruction or data migration.

A redundant switch 55 may be disposed between the external environment and a plurality of RAID controllers RC, so that the failure of a single RC does not result in failure of the system 300. Either of the RCs may fail, but the other RC may continue to service the external environment by routing the requests to the remaining RC. Providing that the hardware is designed and configured for "hot swapping", the failed RC may be replaced and full system operation restored. In the present example, where there are only two RCs, a reduction in system throughput may be experienced if the system is heavily loaded. However, systems with a plurality of RCs will have a reduction in performance of less than or up to approximately equal to the inverse of the number of RCs over which the operating load can be distributed. Similarly, the effect of the failure of a memory M or a memory module MM may be similarly mitigated in a memory system with a larger number of memories M than shown in this example.

While the underlying memory system complex 300 may operate as a flat address space having a large and potentially extensible memory, individual users of the memory system as a service may not need a memory of the size available. Moreover, individual users may have different data protection, data reliability, system availability, latency or other service parameters that are specific to the user of the user application. A user may also have a plurality of different application programs that are serviced by the memory system complex 300. Such uses of a memory system are often described as virtualization. In essence, a portion of the memory area may be defined as a logical storage unit and given a Logical Unit Number (LUN). The user application may then store and retrieve data from a memory area having LBAs which are associated with the LUN and not with the memory system per se. A mapping may be performed such that the LUN and LBA are mapped into the overall LBA space of the memory system complex 300. The LBA space of the memory system complex 300 may then be managed so as to provide the specified service characteristics in a manner that is transparent to the user.

In an aspect, a plurality of logical memory areas LMA comprising the user accessible memory space of the memory system complex 300 may be defined so that each of the plurality of logical memory areas LMA has one or more concatinated LBAs, and particular performance characteristics. The mapping of a LMA to the physical storage locations may be accomplished in any manner that is masked to the using application. In a FLASH memory system, this abstraction is called a Flash Translation Layer (FTL) and may be a simple arrangement as in the case of a thumb drive, or a sophisticated set of algorithms adapted to a hardware architecture such as has been described herein. One or more of the LMAs may be grouped to form a LUN that is known to and accessible by a user, and it is this LUN and a logical address LBA within the LUN that the user addresses to read and write data.

Figure 7:
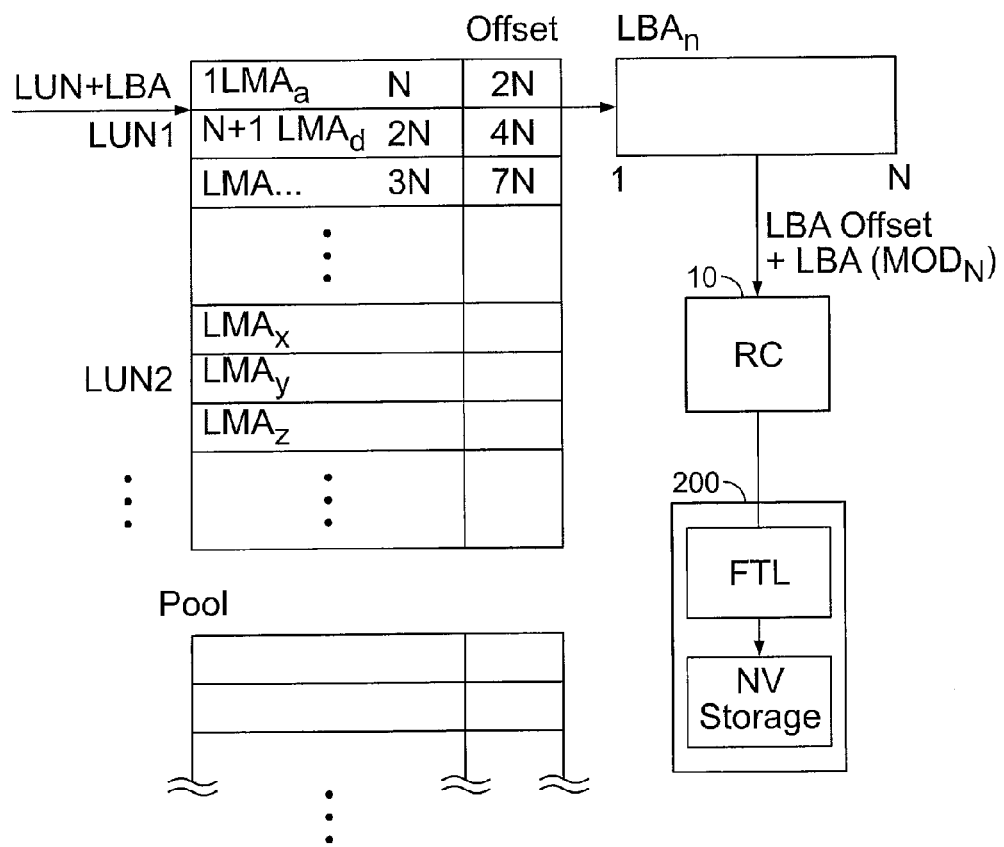
FIG. 7 shows an example of a memory system similar to that shown in FIG. 6, with the connections to the servers being through a network connection, and each of the RAID controllers are capable of communicating with each of the other RAID controllers through an out-of-band or in band channel.

Returning to a simple case, shown in FIG. 2, where the memory system complex 300 comprises a RAID controller RC and a memory system 200, the logical addressing schema may as shown in FIG. 7. A LUN is comprised of a plurality of logical memory areas (LMA), each memory area being represented by a sequential range of LBAs. So, to a user accessing a LUN and a LBA in the LUN would be mapped to the LBA memory space of the memory system complex 300 by an offset variable that depends on the mapping of the LMA to the flat logical memory space of the memory system complex. In the present example, LUN1 and LUN2 are two separate virtual memory spaces, each one accessible by a user having appropriate access privileges. Each LUN is formed by a logical concatenation of logical memory areas LMA. Here LUN1 has three LMAs, LMAa, LMAb and LMAc of size N. Each of the LMAs is associated with a memory range of size N in the flat address space of the memory system complex by an offset variable (OFFSET). This does not preclude, for example, the assembling of a plurality of separate physical memory areas into an equivalent logical memory area.

So, an address identified as LUN1, and a user LBA between N+1 and 2N may be mapped to LMAd in LUN1, where the total address space is LMAd has a size of N. LMAd has a relationship to the flat address space in the memory system complex through a previously assigned offset, in this case 4N. That is each LMA has a size N, in this example, and there may not be a continuous mapping of the LBA space of the LUN to the LBA space of the memory system complex 300. However, each LBA of LUN1 is mapped to a unique LBA address in the memory system complex. As has been previously described, this LBA address can be mapped to the physical storage locations currently used for the data of the LBA space through the action of the RAID controller RC and the FTL, so that data may be stored and retrieved by a using application through the LUN abstraction. At any time, each LUN has a unique set of memory locations available for use. The size of the memory space is determined by the number of LMAs allocated to the LUN and, since user needs vary, the number of LMAs that have been assigned may differ between, for example, LUN1 and LUN2.

When an application program supplies a LUN and associated LBA, the LUN translation table associates the LUN and LBA with one or more of the LMAs and a logical address within the memory system complex 300 address space. As the memory system complex LBA address word may be larger than the physical memory (being, for example, 64 bits), address space may be contiguous or non-contiguous, and additional physical memory may be added so as to scale up the size of the memory system complex 200. This may be done by various techniques including networking, adding further memory arrays 200 to a switch fabric 20, or the like.

Such an arrangement may serve well initially; however, users may discontinue service, may change the desired terms of service, increase or decrease total memory requirements, and the like. So, over time, various LUNs may be de-allocated, or newly created, and become available for other users, be increased in size, or have other attributes added, modified, or deleted.

In a system where there is more physical memory than logical address space allocated to users, physical memory may be reallocated to different LMAs, and to different LUNs. In an example, a pool of unused logical memory areas LMA are maintained, and these unused LMAs are mapped to ranges of LBAs in the memory system complex that are also available, and which have a commensurate size. A logical memory area LMA added to the tail of the table of LMAs may be formed from a LMA that is no longer required by a user, and which has been erased. Other sources of pool LMAs may be the result of wear leveling, garbage collection, refreshing operations, or the addition of physical memory modules.

The size of a LMA chosen would depend on a specific system design; however, let us assume that the users of this memory system complex can be allocated memory in chunks of 1 GB size. These memory chunks may be contiguous physical addresses, but this is not intended to be a limitation. So, each of the LMAs would have a size of 1 GB and, in this example, the size of a user LUN may be increased or decreased in units of 1 GB. There is no requirement for the LUN address space to be continuous, and there may be gaps in the logical memory space equal to one or more of the LMAs. However, a request for an operation for a LBA in any of the LMAs not allocated to the LUN would result in an error condition. That is a LBA not within the range of any LMA (taking account of the OFFSET) does not map.

Since users may pay for memory by the size of the memory and other attributes such as RAID type, snapshots, backup and the like, a user may request a change in the configuration of the memory service being provided through the LUN. Subject to appropriate policies, an overprovisioned memory system complex may provide this capability of managing LUN allocations.

In the example of FIG. 2, the management of the LUNs may be fairly straightforward as has been described. However, in larger systems, there may be multiple RAID controllers and a plurality of data and command paths between the user environment and the memory system complex, and the memory may be shared amongst a plurality of RAID controllers, for example.

Figure 9:
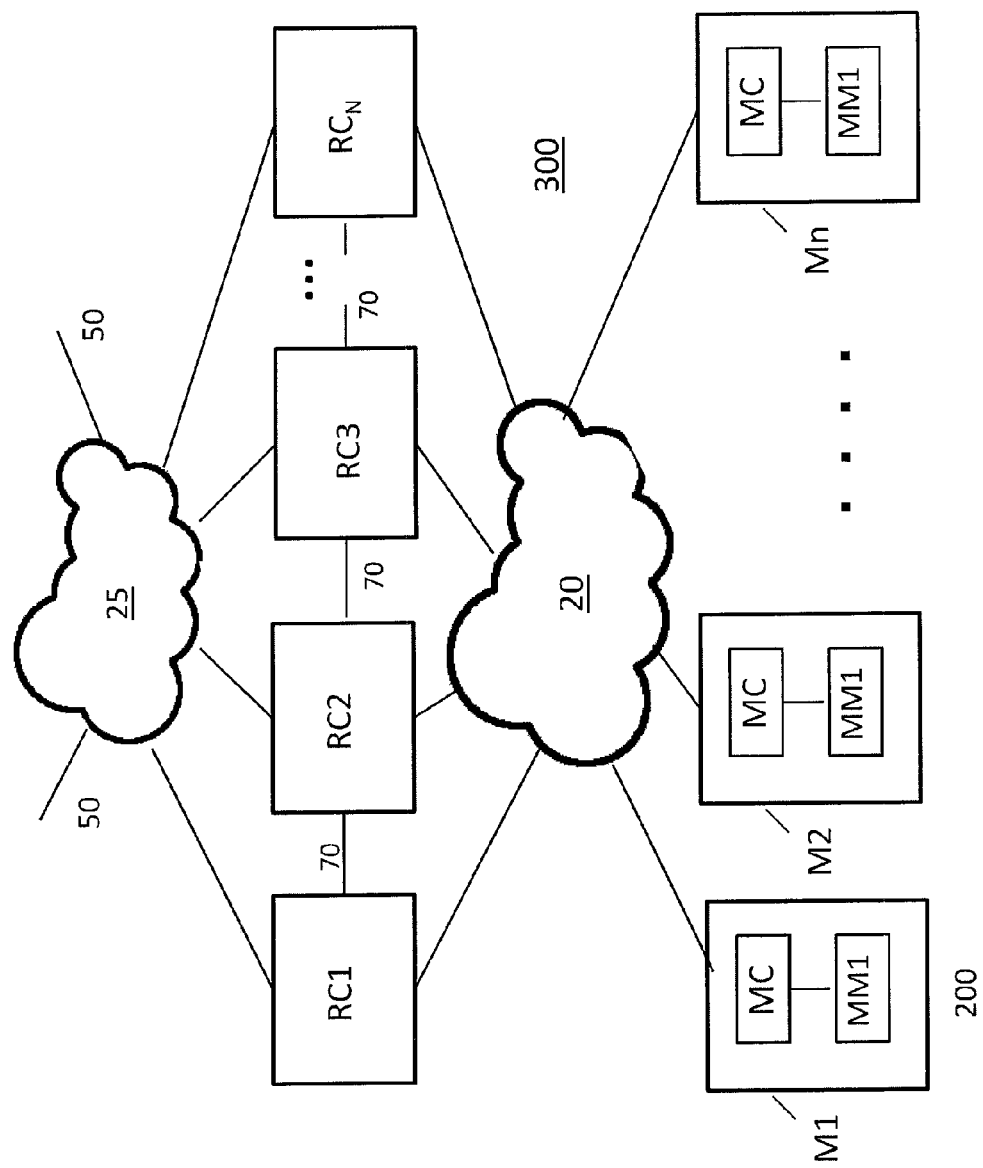
FIG. 9 is a detail of the free memory pool of FIG. 8 and a LUN where a free memory area is dequeued from the free block pool and associated with the LUN being maintained.

FIG. 9 shows a memory system complex 300 having a plurality of memory systems 200, communicating with a plurality of RAID controllers 10 through a switch fabric 20. The RAID controllers 10 may communicate with the external environment through a network or switch fabric 25 having a plurality of external interfaces 50. Such configurations may provide for redundant communication paths between redundant storage or computational resources, so as to improve response time and provide continuity of service during failure conditions.

In a system having a plurality of interfaces to a user environment, there are aspects of security, data integrity and other coordination issues that need to be considered. These are often dealt with in part by higher level supervisory systems, encryption, MAC address filtering, or the like. For the present discussion, we assume that all requests for access to data, for reading or writing, and requests for management of system resources are authorized, in the sense that only a valid user or manager of the system is able to make a request that will be acted upon.

Figure 8:
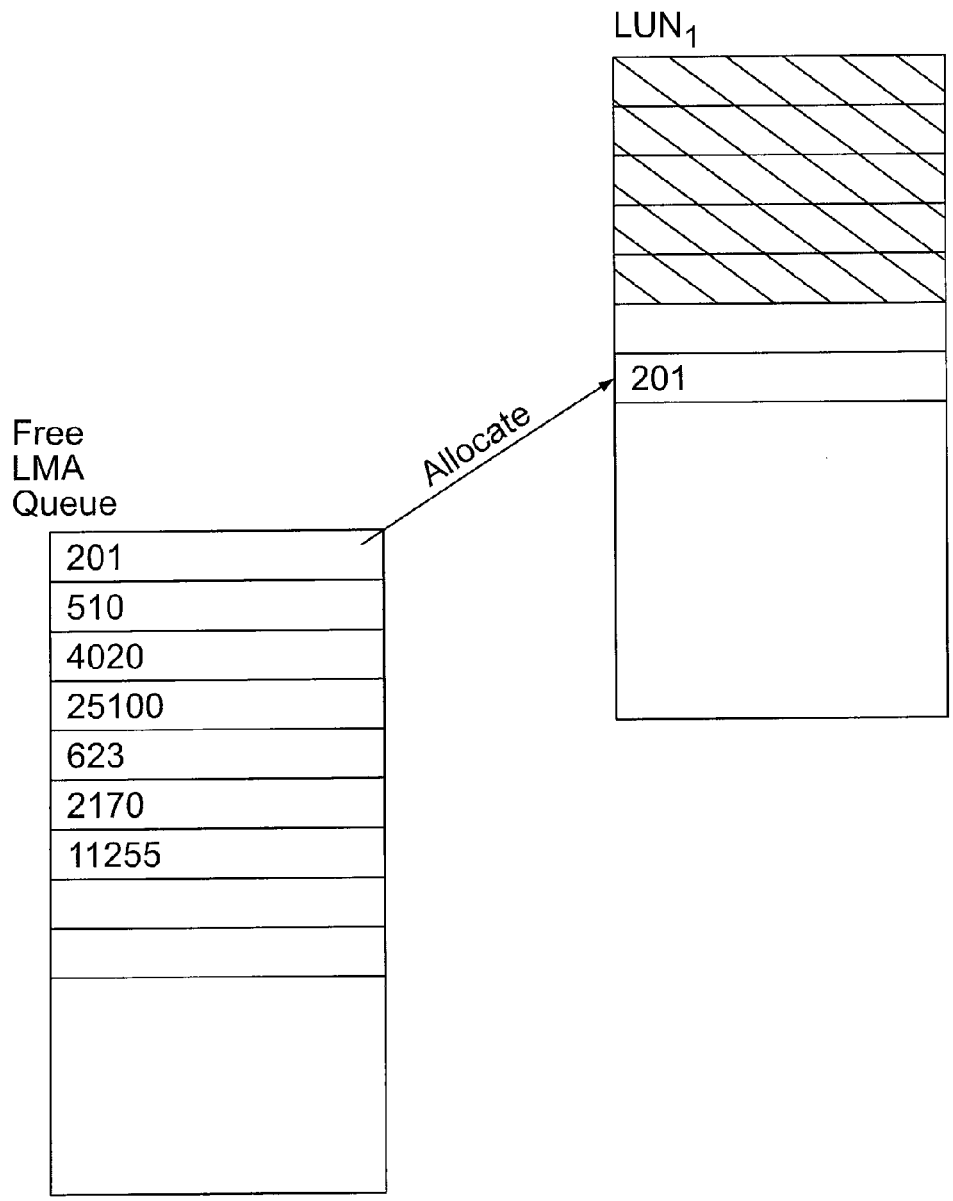
FIG. 8 shows an example of a free memory area pool where a plurality of LUNS are allocated free memory areas from the pool so as to form a LUN.

FIG. 8 shows an example of a LUN allocation table and process at a single RAID controller RC, which may be RC1 of FIG. 8. A request to modify the properties of LUN1 to add a LMA results in the transfer of LMA201 from the pool of available LMAs to LUN1. LMA 201 is now part of the address space of LUN1, and the top of the pool of available LMAs now becomes LMA510.

This is a satisfactory operation if the access to LUN1 was restricted to paths that only traversed RC1. However a memory system complex 300 as shown in FIG. 9 may permit a request to access a memory location through another of the RAID controllers, for example, RC3. For the system to provide such access, RC3 would also need to maintain a map between LUN1, which is a user facing abstraction, and the plurality of LMAs comprising LUN1. The LMAs are an abstraction facing the memory. In particular, the newly added LMA201 needs to be recognized as associated with LUN1, and the global memory pool (that is the appropriate local pools) of available LMAs needs to be updated to reflect the allocation of LMA201 to LUN1.

While only valid users may make requests to access a particular LUN, the system managing the memory system complex 300 may have multiple manager stations that can directly access the memory system complex 300 through, for example, external interfaces 50, or through other means. Large systems may have a plurality of users whose actions are not coordinated with the system managing the memory system complex 300. So, for example, read requests to a particular LUN and LBA may be received from a plurality of users contemporaneously. In an aspect, requests may be directed to the LUN without verification of the extent of the LUN, and one type of service that may be provided may be the immediate allocation of temporary or persistent storage to these requests that require additional storage space.

So, while RC1 may be responding to a request to allocate an LMA to LUN1, RC3 may be responding to a request to allocate an LMA to LUN20, where these requests may have been initiated independently of each other. Both LUN1 and LUN20 may exist on all of the RCs of this example, but the change in LMA allocation is initiated on only one of the RCs. Yet, a request for access to the storage of a LUN may be received at any of the RCs. While RC1 may have allocated LMA 201 to LUN1, RC3 may also have allocated LMA 201 to LUN20. If this situation occurs, requests to LUN1 and to LUN20 would be routed to the same LMA space, even though the request was intended to be executed through only one of the LUNs. This can result in incorrect data being read or written to the storage memory 200.

A method of resolving such allocation conflicts is needed to permit multiple user access to a memory system complex 300.

Broadly, the system and method described herein uses a same data structure at each of the RAID controllers to manage the allocation of LMAs to LUNs. The LUNs and the LMAs, however, have a global (within the memory system domain) definition and are shared between the users of the plurality of RAID controllers.

When a "same" table of free LMAs at each of the RAID controllers of the group of RAID controllers is described, this characteristic is present in the steady state, when there have been no allocation errors. So, initially we may expect that, if the tables at each of the RAID controllers were to be compared with each other, they would be the "same". The plurality of versions of the same table may be resident in each of the memory controllers of the group of RAID controllers.

When a request to allocate memory (in this situation described as one or more LMAs) to a LUN is received at one of the RAID controllers, an LMA is selected from the free LMA table at the RAID controller in accordance with a policy. Such a policy may have placed a specific LMA at the head of the queue on the basis that it is the least used of the LMAs and this selection would be in accordance with a garbage collection policy.

At the moment that the LMA has been dequeued from the free LMA table at the RAID controller making the allocation, the free LMA table at the RAID controller is different in content from the free LMA table at the other RAID controllers. They are no longer "the same." Consequently, the RAID controller that performed the LUN maintenance operation sends a message to the other RAID controllers of the group of RAID controllers, directing that the same LMA that was dequeued at the requesting RAID controller be similarly dequeued at the other RAID controllers and assigned to the same LUN as it was assigned to at the requesting RAID controller. Once this operation is performed at all of the RAID controllers that participate in the process, and the result has been confirmed to the requesting RAID controller, the free LMA tables at all of the RAID controllers, and the LUNs at all of the RAID controllers are "the same". At the completion of this process any user request to any of the RAID controllers to perform a memory operation on any valid LBA will be successful.

However, there is, as yet no mechanism to prevent another user, accessing another of the RAID controllers, from initiating a LUN maintenance operation. Since any LUN maintenance operation that requires dequeuing a LMA form a local free LMA table causes the LMA tables at the plurality of RAID memory controllers, this situation needs to be recognized and accommodated in order to avoid loss of coherency.

Depending on the speed with which the LUN maintenance is to be performed, the performance of out of sequence LUN maintenance operations may be prevented by issuing locks and other messaging. When the process is being performed in a high performance memory system, the time to do this may result in the need for a substantial data queue and temporary bottlenecks in the flow of data. Several approaches may be used to avoid delays in performing user requests while identifying and correcting misallocation of LMAs to LUNs at the individual RAID controllers.

In an example, the objective is to continue to operate the memory system at full speed while performing the LUN maintenance and to recognize and correct any misallocations promptly, if they do occur. Other methods of performing this function will be apparent to a person of skill in the art, based on this description.

The system of FIG. 9 is shown as having a ring-type connection between the plurality of RAID controllers RC using a communications channel 70. Alternatively, the RC may intercommunicate using switch fabrics 20 or 25, or some other out-of-band communications path. While any misallocations need to be corrected so as to avoid data errors, the number of such miss-allocations may be limited except in pathological cases. As compared with individual operations such as reads and writes, the number of requests to allocate LMAs to LUNs would be limited, (since, in this example, the memory size allocated would be 1 GB) and the spacing between such independent requests would usually be sufficient in time such that the allocation of a free LMA to a particular LUN could be performed at each of the controllers without a conflict in assignment. Such cases may be mitigated by for example, limiting the rate at which any RC can allocate LMAs in response to an external request. Excessive activity in LUN allocation may be pathological behavior and may be an attack on the system.

The time of receipt of a LUN configuration request may be bound to the request at the RC. Alternatively, another globally available index may be used. The purpose is to order all of the requests by time regardless of the RC at which the requests are received. In case of a tie, the system may, in accordance with a policy, allocate priority based on, for example, the RC number. Alternatively, for example, both requests may be considered to be invalid, and are given two separate new sequence numbers and reissued.

Figure 10:
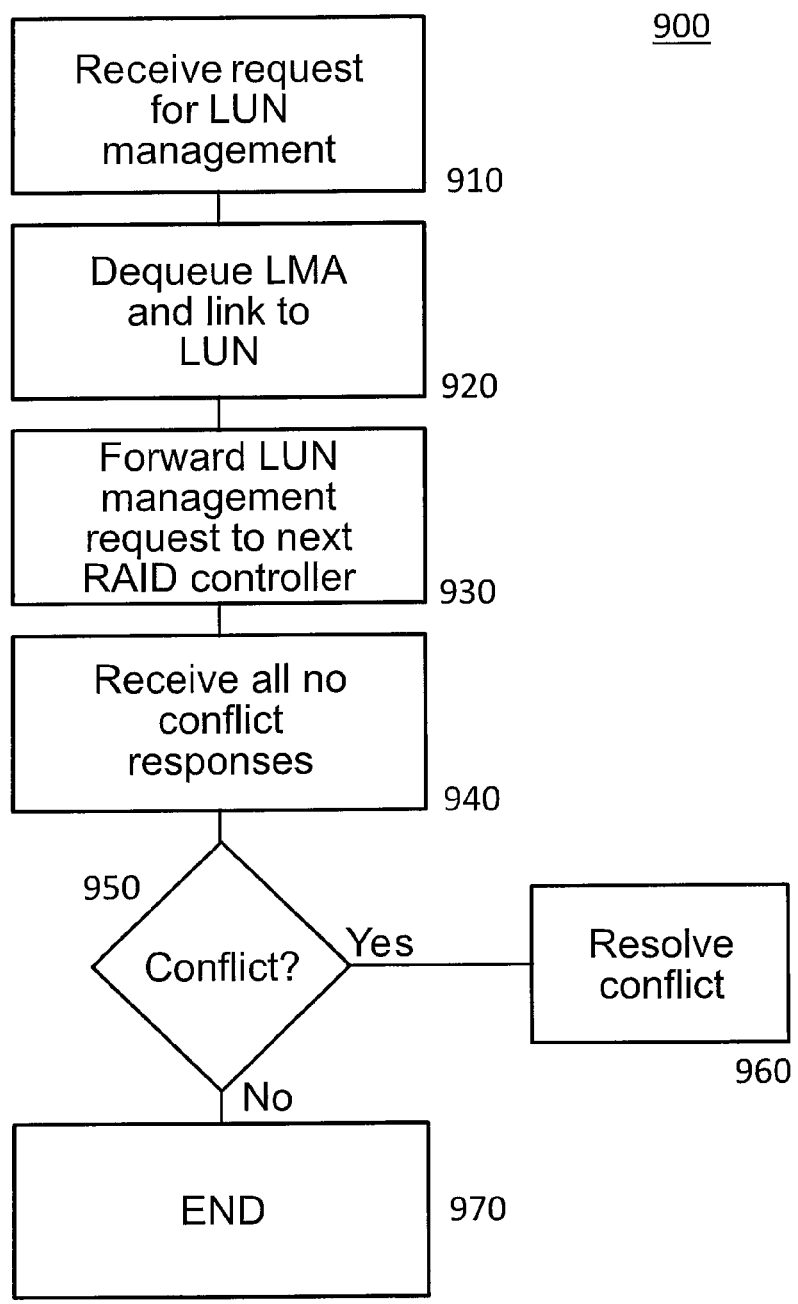
FIG. 10 is a flow chart of an example of the method of LUN management.
Figure 11:
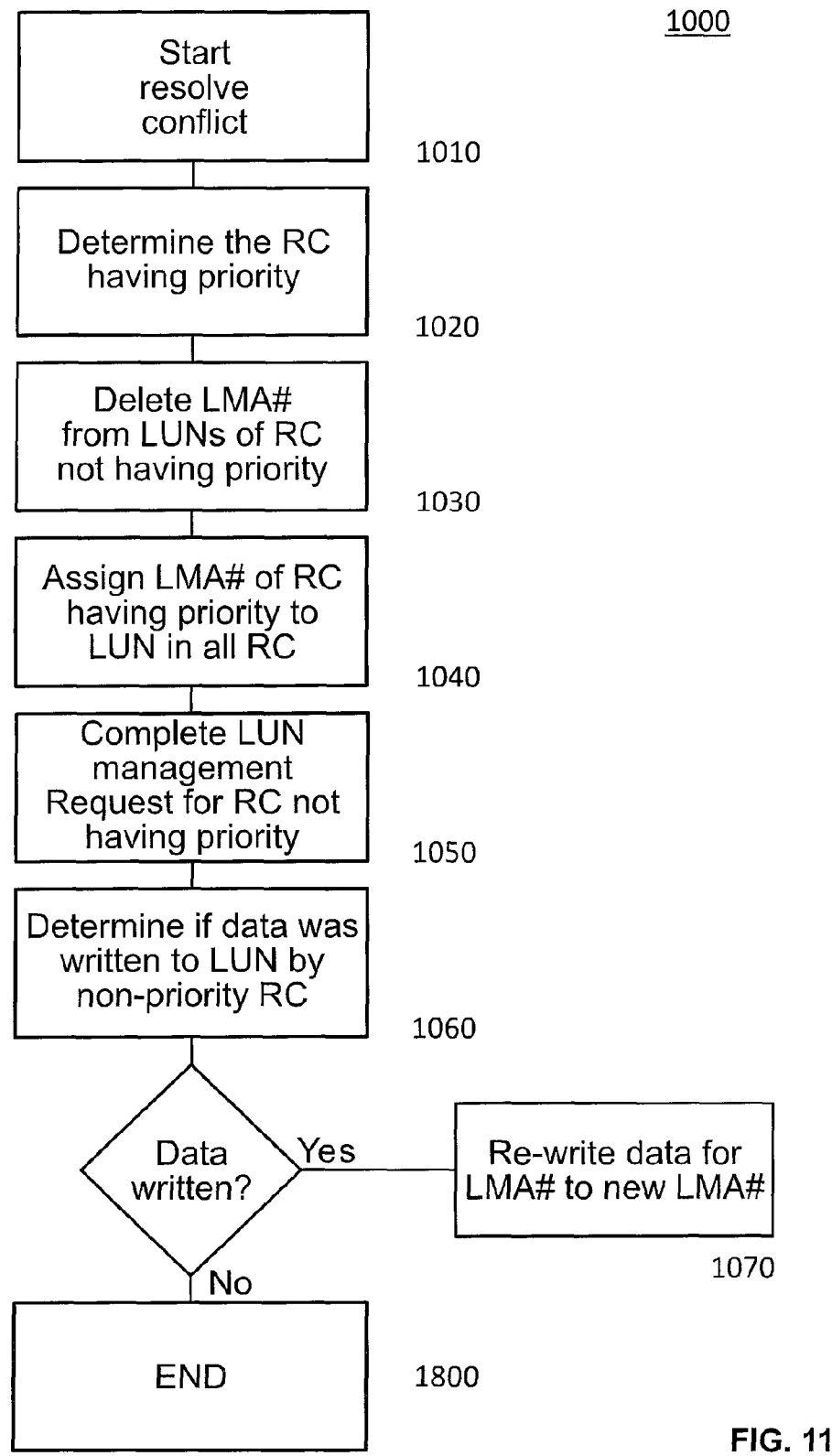
FIG. 11 is a flow chart of an example of a method of resolving a conflict in free memory assignments in accordance with a policy.

FIG. 10 illustrates one method of performing the LUN management function 900. A LUN management request is received (step 910) at a particular RC (e.g., RC1) and allocated a time stamp. The LUN management operation is performed, as previously described, by selecting the first available LMA from the top of the global LMA pool (see FIG. 8) and allocating the first available LMA to the LUN being maintained. Once the LUN table at RC1 has been updated, access to the added LMA region of memory can be permitted immediately. Note that, in this process, the LMAs in the global LMA pool are formed of erased memory areas. So, reading from a LBA that maps to the new LMA would return an invalid result as there is no stored data. But any write operation to a newly assigned LMA that is performed through RC1 will occur. An attempt to immediately write to or to read from the same LMA that is performed through another RC (e.g. RC3), would fail as there would be no mapping to a valid memory address. Depending on the method by which such failures are handled, the request may be processed on a retry.

After having made the allocation in RC1, the RC sends a service message to the other RCs, requesting that LMA201 be allocated to LUN1. (step 930). When the request is received at RC2, for example, the local version of global LMA pool is checked and, if LMA201 is the top LMA on in the pool table, LMA 201 is allocated to LUN1 on RC2. However, if LMA510 is on the top of the local version of the global pool table, this indicates that LMA201 has already been allocated at RC2 by an almost simultaneous LUN maintenance request received by RC2, to maintain a different LUN, for example LUN20. This results in LUN1 having LMA201 assigned in RC1 and LUN20 in RC2 having LMA201 assigned. The assignment of LMA201 to different LUNs in different RCs is an error that needs correcting.

For the moment, assume that the top of the global LMA pool in RC2 is LMA201. As this would indicate that no other LMA assignment has been made, LMA201 can be assigned to LUN1 in RC2. A success message is returned to the initiating RC (RC1). When this process has been completed at all of the RCs and success messages returned to RC1 (step 940) the messages may be inspected to determine whether there was a conflicting assignment (step 950). If there is no conflict, the maintenance has been successfully completed (step 970). However, if one or more of the success messages indicates a conflicting assignment, then the conflict needs to be resolved (step 960).

The success message, in the event of a conflict, may include the time stamp of the conflicting LUN management request, the RC at which the conflict has occurred, and the LUN to which the conflicting LMA (in this example LMA201) has been assigned. RC3 will have returned a success message indicating a conflict. LMA201 was previously assigned to LUN20 at RC3. The time of receipt of the LUN maintenance message at RC3 may be used to determine the priority of the two LUN maintenance requests (step 1020). For this example, consider the case where the LUN maintenance request at RC1 had the earlier time stamp, giving that request priority. (For simplicity, we assume that only one RC has performed an out-of-time-sequence LUN maintenance action.) A message is sent from RC1 to RC3 so as to de-allocate LMA201 from LUN20. Step 1040 of assigning LMA201 to LUN1 at RCs 2, 4 and 5 may be performed prior to the return of the success message to RC1, as there had been no earlier allocation of LMA201 to a LUN at the other RCs.

At RC3 remedial action needs to be taken. A write action to LMA201 may have occurred by data being written to LUN20 by RC3. So, there may be incorrect data in a memory address of LMA201, at least with respect to data which is in LUN1. In an aspect, each RC may keep track of the condition of a newly allocated LMA. In the case where no data has been written to the misassigned LMA by an incorrect LUN, then LMA has either correct data or no data, since the LMA was completely erased prior to having been assigned to the LUN. So, the management process can be completed by assigning LUN201 to LUN1 at RC3. Now, all of the tables for LUN1 are the same across the RCs, and the top of the LMA table is LMA510 in all modules. This is the desired state.

Where data had been written to LMA201 by LUN20, a problem exists as this data would be incorrect. Data may also have been written to LMA201 by LUN1 of another RC, thus co-mingling data from two LUNs. Each of the RCs has a buffer memory that is capable of storing data for a short period of time. The buffer memory may be a combination of volatile and non-volatile memory, with a capability for storing the volatile memory data to the non-volatile memory in the event of a power loss or other system failure. The size of this memory may be large enough to store data during the time period between the receipt of the request from the user environment and the time when the user request is completely stored in non-volatile memory.

While the memory system complex 300 may have acknowledged the receipt of a write request to the user, the data may still be in the process of being stored, the data being retained in the RC buffer memory 11.

Where data has already been written to LMA201 by LUN20, the data in LMA201 will need to be discarded. Depending on the stage of the commitment process, the request to write data may be aborted. If the data has been written and the location to which the data has been written can be identified, the LBA memory location can be written with an invalid data tag.

A write failure indication can be issued with respect to LUN1 and LUN20 so as to prompt a replay of data from the buffer memory 11. In the case of LUN1, data will again be written to LBAs associated with LMA201, and the resultant data will be correct. The FTL will have relocated the data to other memory locations of the physical memory, but the data that would be properly associated with the LBA.

The request to maintain LUN20, which was received at RC3 may now be performed (step 1050) so that the next available LMA, LMA510 is associated with LUN20 at each of the RCs. When the buffer 11 is replayed with respect to LUN20, the data that had erroneously written to LMA201 is now correctly written to LMA510. The stored data for LUN20 is also now correct.

Depending on the approach taken to re-writing the data, only the data that would have been written to LMA201 by either of LUN1 or LUN20 may need to be rewritten.

Although the present invention has been explained by way of the examples described above, it should be understood to the ordinary skilled person in the art that the invention is not limited to the examples, but rather that various changes or modifications thereof are possible without departing from the spirit of the invention.

What is claimed is:

1. A method for managing a memory system, comprising:
    providing a group of controllers in communication with a plurality of memory modules;
    maintaining at each controller of the group of controllers, a pool of same free memory areas of the plurality of memory modules,
        wherein logical units are formed from same free memory areas selected from the pool of same free memory areas at each of the controllers of the group of controllers;
    maintaining a logical unit of the logical units accessable by the group of controllers by:
        receiving a request for maintenance of the logical unit at a first controller of the group of controllers;
        selecting, at the first controller, a first free memory area from the pool maintained at the first controller and associating the first free memory area with the logical unit being maintained;
        deleting the first free memory area from the pool of the first controller;
        requesting, by the first controller, that each of the group of controllers associate the first free memory area from the pool of same free memory areas maintained at each controller with the logical unit being maintained at the each of the controllers; and,
        receiving, at the first controller, a failure status message or a success status message from the other controllers indicating a failure status or a success status of the request to associate at each of the other controllers.

2. The method of claim 1, responsive to a request received from the first controller, each of the other controllers of the group of controllers performs the step of assigning by determining whether the first free memory area is available in the pool of same free memory areas of the controller; and,
if the first free memory area is available:
associating the first free memory area with the logical unit at the controller and deleting the first free memory area from the pool of the controller; and
returning a success status message to the requesting controller; or,
if the first free memory area is not available in the pool of free memory areas of the controller:
returning a failure status message to the requesting controller.

3. The method of claim 1, further comprising:
processing the received status messages received from the other controllers of the group of controllers; and,
if all received status messages are success status messages, continuing to associate the first free memory area with the logical unit; or
if at least one of the status messages is a failure status initiate a conflict recovery procedure in accordance with a policy.

4. The method of claim 2, wherein each received request for maintenance message is assigned a global priority indicator to be used to resolve a conflict status.

5. The method of claim 3, wherein a global priority indicator of the request for maintenance of the requesting controller is compared with a global priority indicator of the failure status message, wherein the global priority indicator of the failure status message is the global priority indicator of another request for maintenance received at a responding controller that resulted in the association of the first free memory area with another logical unit.

6. The method of claim 5, wherein the global priority indicator of the request for maintenance and the global priority indicator of the failure status message are used to resolve the conflict in accordance with a policy which determines the request for maintenance to have priority.

7. The method of claim 1, further comprising: if the first free memory area is not in the pool of free memory areas of the controller receiving the request; determining a logical unit with which the first free memory area has been associated at the controller; and determining if a write operation has been performed to the first free memory area associated with the logical unit at the controller.

8. The method of claim 1, wherein the first fee memory area is a plurality of free memory areas.

9. A computer program product, stored in a non-transient memory, comprising:
instructions for configuring a group of controllers in communication with a memory array such that the controllers are operable to:
maintain, at each controller of the group of controllers, a pool of free memory areas of a plurality of memory modules of the memory array, wherein a same logical unit is formed at each of the group of controllers from the same free memory areas selected from the pool of free memory areas maintained at each controller;
receive a request for maintenance of a logical unit at a first controller of the group of controllers;
select a first free memory area from the pool of free memory areas and associate the first free memory area with the logical unit being maintained at the first controller;
request each of the other controllers of the group of controllers to assign the same first free memory area from the pool of free memory areas at the controller receiving the request to the logical unit being maintained; and
receive a failure message or a success message from the other controllers,
wherein a first free memory area in the pool of the memory areas maintained by each of the controller is associated with a same memory area in the memory array.

10. The computer program product of claim 9, wherein each of the other controllers of the group of controllers is configured to determine whether the requested first free memory area is in the pool of free memory areas of the controller; and
if the first free memory area is available in the pool of free memory areas:
associate the first free memory area with the logical unit and maintain the pool by deleting the free memory area from the pool of free memory areas of the controller; and
return a success message to the requesting controller; or,
if the first free memory area is not available in the pool of free memory areas of the controller:
determine the logical unit with which the first free memory area has been associated:
determine if a write operation has been performed to the first free memory area; and
return a status message to the requesting controller.

11. The computer program product of claim 10, further comprising:
the computer further configured to:
process the status message and determine if a misallocation of the free memory area has occurred, and to correct the misallocation in accordance with a policy.

12. A memory system, comprising:
a plurality of memory controllers in communication with a plurality of users;
a plurality of memory modules in communication with the plurality of memory controllers;
wherein each controller of the plurality of controllers is operable to:
maintain a pool of free memory areas of the plurality of memory modules at each controller of the plurality of controllers, wherein a logical unit is formed from free memory areas selected from the same pool of free memory areas;
receive requests for maintenance of the logical unit from the user at a first controller of the plurality of controllers, wherein the free memory areas are mapped to physical memory of the memory modules;
select a first free memory area from the pool of free memory areas and associate the first free memory area with the logical unit being maintained;
request each of the other controllers of the plurality of controllers to assign the first free memory area from the pool of free memory areas to the logical unit being maintained; and
receive a status or a success message from the other controllers
wherein the first free memory area in the pool at each controller is associated with a same memory area of the memory modules.

13. A method of managing a memory array having logical unit numbers, the method comprising:
associating a plurality of memory controllers with the memory modules of the memory array;
maintaining a pool of free memory areas of the memory array, the pool of free memory areas at each memory controller being a same pool of free memory areas;

associating a same logical unit number at each of the memory controllers with a same free memory area extent in the memory array;

receiving, at a first controller of the plurality of controllers a request from a user for maintenance of a logical unit number;

assigning, at the first memory controller of the plurality of memory controllers a first free memory area from the pool to the logical unit number and deleting the first free memory area from the pool at the first memory controller;

requesting, by the first controller, that the other memory controllers perform the step of assigning the first memory area from the pool at each memory controller of the other memory controllers to the same logical unit number as was associated with the first memory area at the first controller;

determining, by each of the other memory controllers whether the first memory area is present in the pool at the controller; and, if the first memory area is present, perform the assignment and send a success message to the first memory controller; or, if the first memory area is not present, send a failure message, wherein the first memory area in the pool of the first memory controller and the first memory area in the pool of each of the other memory controllers is associated with a same memory area of the memory array.

14. The method of claim 13, further comprising:

prior to sending a failure message:
   identify the logical unit number at the controller receiving the request to which the first memory area has been assigned;
   determine if a write operation has been performed to the first memory area by the controller; and,
   if the write operation has been performed, perform a recovery action in accordance with a protocol; or
   if the write operation has not been performed, reassign the first memory area to the logical unit number being maintained.

* * * * *